United States Patent
Yamada et al.

(10) Patent No.: US 10,239,481 B2
(45) Date of Patent: Mar. 26, 2019

(54) POLYESTER BASE FABRIC FOR AIRBAG, POLYESTER AIRBAG, AND METHOD OF MANUFACTURING POLYESTER BASE FABRIC FOR AIRBAG

(71) Applicant: Toray Industries, Inc., Tokyo (JP)

(72) Inventors: Riku Yamada, Otsu (JP); Nobuaki Tanaka, Osaka (JP)

(73) Assignee: Toray Industries, Inc. (JP)

( * ) Notice: Subject to any disclaimer, the term of this patent is extended or adjusted under 35 U.S.C. 154(b) by 43 days.

(21) Appl. No.: 15/562,009

(22) PCT Filed: Mar. 10, 2016

(86) PCT No.: PCT/JP2016/057555
§ 371 (c)(1),
(2) Date: Sep. 27, 2017

(87) PCT Pub. No.: WO2016/158287
PCT Pub. Date: Oct. 6, 2016

(65) Prior Publication Data
US 2018/0086300 A1    Mar. 29, 2018

(30) Foreign Application Priority Data
Mar. 30, 2015  (JP) .................. 2015-069980

(51) Int. Cl.
*B60R 21/235* (2006.01)
*D03D 1/02* (2006.01)
*D03D 49/22* (2006.01)
*D03D 15/00* (2006.01)
*C08L 67/03* (2006.01)

(52) U.S. Cl.
CPC ............ *B60R 21/235* (2013.01); *D03D 1/02* (2013.01); *D03D 15/00* (2013.01); *D03D 49/22* (2013.01); *C08L 67/03* (2013.01); *C08L 2205/16* (2013.01); *D10B 2331/04* (2013.01); *D10B 2505/124* (2013.01)

(58) Field of Classification Search
None
See application file for complete search history.

(56) References Cited

U.S. PATENT DOCUMENTS

| 6,135,161 A | 10/2000 | Nakano et al. |
| 2013/0147170 A1 | 6/2013 | Tanaka et al. |

FOREIGN PATENT DOCUMENTS

| JP | 9-105047 A | 4/1997 |
| JP | 2000-328388 A | 11/2000 |
| JP | 2001-114051 A | 4/2001 |
| JP | 2006-16707 A | 1/2006 |
| WO | 2012/026455 A1 | 3/2012 |

*Primary Examiner* — Shawn McKinnon
(74) *Attorney, Agent, or Firm* — DLA Piper LLP (US)

(57) ABSTRACT

A polyester base fabric for airbags woven from polyester fiber has an energy absorption amount in a warp direction (EW) when the polyester base fabric is elongated up to a stress of 118 N/cm and subsequently relaxed to a stress of 0 N/cm of 1.0 to 3.0 J/cm$^2$; an energy absorption amount in a weft direction (EF) when the polyester base fabric is elongated up to a stress of 118 N/cm and subsequently relaxed to a stress of 0 N/cm of 1.0 to 3.0 J/cm$^2$; and a ratio (EW/EF) of the energy absorption amount in the warp direction (EW) to the energy absorption amount in the weft direction (EF) of 0.5 to 2.0.

10 Claims, 2 Drawing Sheets

FIG. 3

POLYESTER BASE FABRIC FOR AIRBAG, POLYESTER AIRBAG, AND METHOD OF MANUFACTURING POLYESTER BASE FABRIC FOR AIRBAG

TECHNICAL FIELD

This disclosure relates to a polyester base fabric for airbag, a polyester airbag, and a method of manufacturing a polyester base fabric for airbag. More specifically, the disclosure relates to a polyester base fabric for airbag which assures that an airbag with improved restraint performance to receive a passenger at the time of deployment can be manufactured while ensuring mechanical properties as an airbag, a polyester airbag produced by sewing the polyester base fabric for airbag, and a method of manufacturing the polyester base fabric for airbag.

BACKGROUND

In recent years, many kinds of airbags have been installed as a passenger safety device for automobiles. Examples of airbags include an airbag for a driver's seat, an airbag for a passenger's seat, an airbag for thigh protection built in a seat, a curtain airbag deploying along a side window and the like. For a base fabric constituting an airbag, base fabrics made from a polyester fiber, which is inexpensive in raw yarn cost than a polyamide fiber, have been desired. However, airbags having sufficient properties have not been obtained from a polyester fiber, compared to ones from polyamide fiber. Therefore, polyamide fibers such as nylon 6,6, and nylon 6 have been mainly used for base fabrics.

The basic fabric needs to have many kinds of mechanical properties required, in addition to deployment property, for receiving a passenger. To satisfy these requirements, for example, WO 2012/26455 proposes a base fabric intended to have high pressure resistance in a boundary portion between an inflation part and a non-inflation part and to restrain a passenger by quickly grasping him/her. Also, JP 2001-114051 A proposes a base fabric intended to have an improved deployment property while ensuring mechanical properties as an airbag by changing the warp density and the weft density. Also, JP 2000-328388 A provides a method of manufacturing a high density woven fabric intended to satisfy low air permeability, weaving properties, productivity for a base fabric for airbag.

All of the base fabrics specifically disclosed in WO 2012/26455, JP 2001-114051 A and JP 2000-328388 A are polyamide fabrics made from fiber such as nylon 6,6, and practically no polyester base fabric has been disclosed.

It could therefore be helpful to provide a polyester base fabric that assures that an airbag with improved restraint performance to receive a passenger at the time of deployment can be manufactured while ensuring mechanical properties as an airbag even though it is made of polyester, a polyester airbag produced by sewing the polyester base fabric, and a method of manufacturing the polyester base fabric.

SUMMARY

We focused on the phenomenon that when stress is concentrated at a sewn portion at the time of airbag deployment, yarn slippage at the sewn portion becomes larger and the restraint performance after deployment tends to be degraded. Also, we focused on the importance of improving an energy absorption amount of a base fabric when a polyester fabric is used for manufacturing base fabrics for airbags.

We thus provide:

A polyester base fabric for airbags woven from polyester fiber, wherein an energy absorption amount in the warp direction (EW) when the polyester base fabric is elongated up to a stress of 118 N/cm and subsequently relaxed to a stress of 0 N/cm is 1.0 to 3.0 J/cm$^2$, an energy absorption amount in the weft direction (EF) when the polyester base fabric is elongated up to a stress of 118 N/cm and subsequently relaxed to a stress of 0 N/cm is 1.0 to 3.0 J/cm$^2$, and a ratio (EW/EF) of the energy absorption amount in the warp direction (EW) to the energy absorption amount in the weft direction (EF) is 0.5 to 2.0.

A polyester airbag is produced by sewing the above polyester base fabric.

A method of manufacturing a polyester base fabric includes a loom having a positive easing mechanism used to perform weaving so that a ratio (E/H) of an easing amount (E) to a shedding amount of a first frame (H) is 3 to 10%.

REFERENCE SIGNS 1 loom
2 warp
3 back roller
4a first frame
4b second frame
4c third frame
4d forth frame
5 sample piece
6 stitch
7 chuck
8 end
9 yarn end
D width direction
E easing amount
EW energy absorption amount in warp direction
EF energy absorption amount in weft direction
H shedding amount of the first frame
I gripping distance
L1 stress-elongation curve in warp direction
L2 stress-elongation curve in weft direction

DETAILED DESCRIPTION

Polyester Base Fabric

A polyester base fabric (which may be simply referred to as a base fabric, hereinafter) is a base fabric woven with yarns formed of polyester fibers. More specifically, the base fabric is made from multifilament yarns of polyester fiber.

Examples of the polyester fiber include polyethylene terephthalate and polybutylene terephthalate. The polyester fiber can be a fiber composed of copolyester in which aliphatic dicarboxylic acid such as isophthalic acid, 5-sodium sulfoisophthalic acid, or adipic acid is, as an acid component, copolymerized with polyethylene terephthalate or polybutylene terephthalate.

In an example, total fineness of the polyester fiber is preferably not less than 250 dtex, more preferably not less than 350 dtex. Also, the total fineness of the polyester fiber is preferably not more than 600 dtex, more preferably not more than 580 dtex. When the total fineness is within the above range, the base fabric is flexible, and mechanical properties (such as tensile strength and tearing strength) of an obtained airbag can be improved. When the total fineness is lower than 250 dtex, the obtained airbag is not likely to obtain sufficient strength. On the other hand, when the total fineness is over 600 dtex, flexibility of the base fabric tends to be degraded. Accordingly, the obtained airbag tends to have a degraded packability or degraded assembly workability. The total fineness of the polyester fiber can be calculated according to JIS L 1013: 2010 8. 3. 1 method A.

A single fiber fineness of the polyester fiber is preferably not less than 2.5 dtex, more preferably not less than 2.8 dtex, further preferably not less than 3 dtex. Also, the single fiber fineness of the polyester fiber is preferably not more than 7 dtex, more preferably not more than 6.8 dtex, further preferably not more than 6.6 dtex. Therefore, the suitable single fiber fineness of the polyester fiber is 2.5 to 7 dtex, which is relatively low fiber fineness. With the single fiber fineness being set within this relatively low value range, rigidity of synthetic fiber filaments of the polyester fiber may be lowered. Therefore, flexibility of the base fabric may be improved. Also, when the single fiber fineness is within this range, melting of the synthetic fiber filaments of the base fabric caused by heat of high-temperature gas emitted from an inflator is likely to be prevented. The single fiber fineness of the polyester fiber can be calculated by dividing the total fineness by the number of filaments. Also, the number of filaments can be calculated according to a method of JIS L1013: 2010 8. 4.

A sectional shape of a single fiber of the polyester fiber is not particularly limited. For example, the sectional shape of the single fiber may have a circular shape, any kind of non-circular shapes including a Y shape, a V shape, and a flat shape, or a shape having a hollow part. Among those, taking spinning operability and quality stability into consideration, the sectional shape of the single fiber has preferably a circular shape.

Back to the general description of the polyester fiber, tensile strength of the polyester fiber of the example is preferably not less than 6.5 cN/dtex, more preferably not less than 7.2 cN/dtex. When the tensile strength of the polyester fiber is lower than 6.5 cN/dtex, an obtained base fabric is not likely to obtain sufficient mechanical properties (such as tensile strength and tearing strength). The upper limit of the tensile strength is not particularly limited. The upper limit is, taking toughness into consideration, about 10 cN/dtex. The tensile strength of the polyester fiber can be calculated by measurement under the constant-rate extension conditions for the standard test specified in JIS L1013 8.5.1.

Elongations of the polyester fiber are preferably not less than 18%, more preferably not less than 20% both in the warp direction and the weft direction. Also, the elongations of the polyester fiber are preferably not more than 28% both in the warp direction and the weft direction. When the elongations of the polyester fiber are within the above range, stress concentration at the time of deployment of the obtained airbag is likely to be better alleviated. The elongations of the polyester fiber can be calculated based on an elongation of a point showing the maximum strength in an S-S curve obtained when the above tensile strength is calculated.

In the polyester fiber, a heat stabilizer, an antioxidant, a light stabilizer, a smoothing agent, an antistatic agent, a plasticizer, a thickener, a pigment, a flame retardant and the like may be suitably mixed. Among those, an antioxidant is suitably mixed because it can allow an airbag to ensure excellent mechanical strength even in the case that the airbag is installed in a vehicle for a long period (for example, more than 10 years). For the antioxidant, for example, copper salt is preferable. When copper salt is mixed, a content of copper per a content of polymer constituting the polyester fiber is preferably not less than 10 ppm, more preferably not less than 30 ppm, further preferably not less than 50 ppm. Also, the content of copper is preferably not more than 300 ppm, more preferably not more than 200 ppm, further preferably not more than 100 ppm. When the content of copper is lower than 10 ppm, heat aging resistance of the polyester fiber tends to be degraded. Also, when the content of copper is over 300 ppm, spinning operability of the polyester fiber tends to be degraded.

Back to the general description of the base fabric, both of warp and weft constituting the base fabric are preferably the same. The warp and the weft made of the same yarn (multifilament yarn) may improve the balance between crimp ratios in the warp direction and the weft direction determined by the total finenesses, the tensile strengths, and the elongations. In the example, the expression that "the warp and the weft are the same" denotes that the warp and the weft both comprise polymers of the same type and have an equal single fiber fineness and total fineness. Also, "polymers of the same type" denotes that primary repeat units of the polymers are common, wherein, for example, multifilaments constituting the warp and the weft are both polyethylene terephthalate. A combination of homopolymer and copolymer is also included in "polymers of the same type" of the example. Multifilament yarns are preferable in terms of production management because the warp and the weft do not need to be differentiated when the presence, types, and amounts of the copolymerization components thereof are the same. Also, the expression "an equal single fiber fineness and total fineness" denotes that the comparison between the single fiber finenesses and between the total finenesses of the warp and the weft shows that the difference between the single fiber finenesses or the total finenesses is 5% or lower of the smaller single fiber fineness or total fineness.

It is preferable that fabric densities of the base fabric in the warp direction and the weft direction are balanced. Specifically, the difference of the fabric densities is preferably 5% or lower, more preferably 3% or lower of the smaller one, and even more preferably the fabric densities are equal. The expression "the fabric densities are equal" denotes that the difference of the fabric densities between the warp and the weft after weaving is 1.5 yarns/2.54 cm or less. The fabric densities can be calculated according to JIS L 1096: 2010 8. 6. 1.

The base fabric of the example is characterized in that the energy absorption amount in the warp direction (EW) and the energy absorption amount in the weft direction (EF) are both 1.0 to 3.0 J/cm$^2$ when the base fabric is elongated to such stress of 118 N/cm and subsequently relaxed to a stress of 0 N/cm. The value of "118 N/cm" corresponds to a stress exerted on the base fabric at the moment of the maximum internal pressure being exerted on a deployed airbag. In other words, for airbags, the energy absorption amount when an airbag is elongated to a stress of 118 N/cm and subsequently relaxed to a stress of 0 N/cm is an important factor in terms of airbag deployment behavior and followability of the airbag in the process of restraining a passenger. The energy absorption amount in the warp direction (EW) and the energy absorption amount in the weft direction (EF) may be not less than 1.0 J/cm$^2$, and is preferably not less than 1.5 J/cm$^2$. The energy absorption amount in the warp direction (EW) and the energy absorption amount in the weft direction (EF) may be not more than 3.0 J/cm$^2$, preferably not more than 2.7 J/cm$^2$, more preferably not more than 2.5 J/cm$^2$, further preferably not more than 2.0 J/cm$^2$. When the energy absorption amount (EW) and the energy absorption amount (EF) are in the above range, the obtained airbag not only has an excellent performance of receiving a passenger at the time of deployment (restraint performance), but also has small yarn slippage at a sewn portion because stress concentration at the sewn portion at the time of deployment is relaxed. As a result, high-temperature gas is not likely to flow into a gap at a yarn slippage part at the sewn portion at the time of deployment, and the airbag has excellent burst resistance. When the energy absorption amount (EW) and the energy absorption amount (EF) are lower than 1.0 J/cm$^2$, the restraint performance at the time of deployment tends to be degraded. Also, the burst resistance of the obtained airbag tends to be degraded. On the other hand, when the energy absorption amount (EW) and the energy absorption amount (EF) are over 3.0 J/cm$^2$, toughness of the base fabric tends to be degraded.

The base fabric of the example is characterized in that the ratio (EW/EF) of the energy absorption amount (EW) to the energy absorption amount (EF) is 0.5 to 2.0. The ratio (EW/EF) may be not less than 0.5, preferably not less than 0.7. Also, the ratio (EW/EF) may be not more than 2.0, preferably not more than 1.5. When the ratio (EW/EF) is within the above range, in the obtained airbag, stress concentration to one side in the warp direction or in the weft direction may be relaxed. When the ratio (EW/EF) is lower than 0.5, yarn slippage at a sewn portion tends to concentrate in the warp direction. On the other hand, when the ratio (EW/EF) is over 2.0, yarn slippage at the sewn portion tends to concentrate in the weft direction.

A cover factor of the base fabric is preferably not less than 2,000, more preferably not less than 2,100. Also, the cover factor of the base fabric is preferably not more than 2,600, more preferably not more than 2,500, further preferably not more than 2,400, particularly preferably not more than 2,300. The base fabric, when the cover factor is within the above range, suitably ensures the mechanical properties (such as tensile strength and tearing strength) and at the same time tends to have a suitable basis weight and is not likely to become rough and hard. When the cover factor is lower than 2,000, the base fabric tends to have a small basis weight and yarn slippage tends to occur. On the other hand, when the cover factor is over 2,600, the base fabric tends to have a large basis weight and to be rough and hard. In the example, the cover factor (CF) is a value calculated from the total fineness and the fabric density of the yarn used for the warp or the weft and is defined by formula (1). In formula (1), D1 denotes a warp total fineness (dtex), N1 denotes a warp density (number of filaments/2.54 cm), D2 denotes a weft total fineness (dtex), and N2 denotes a weft density (number of filaments/2.54 cm).

$$CF=(D1)^{1/2} \times N1+(D2)^{1/2} \times N2 \quad (1)$$

Thickness of the base fabric is preferably 0.35 mm or lower, more preferably 0.32 mm or lower. Also, the basis weight of the base fabric is preferably not more than 300 g/m$^2$, more preferably not more than 270 g/m$^2$, further preferably not more than 250 g/m$^2$. When the thickness and the basis weight are within the above ranges, the base fabric is lightweight and excellent in compactness. When the thickness is over 0.35 mm, the compactness of the base fabric tends to be degraded. Also, when the basis weight is over 300 g/m$^2$, weight of the airbag tends to be heavy. The basis weight can be calculated according to JIS L 1096: 2010 8. 3. 2.

Both in the warp direction and the weft direction, the elongations when the base fabric is elongated to a stress of 118 N/cm are preferably not less than 5%, more preferably not less than 6.5%. Also, the elongations are preferably not more than 10%, more preferably not more than 9%. When the elongations of the base fabric are within the above range, the obtained airbag is excellent in form stability and its shape is likely to be stable at the time of high speed deployment. When the elongations are lower than 5%, the form stability of the obtained airbag tends to be degraded and the shape is not likely to be stable at the time of high speed deployment. On the other hand, when the elongations are over 10%, toughness of the base fabric tends to decline. The elongations of the base fabric can be calculated according to JIS K 6404-3: 1999 6. Test Method B (Strip Method).

The above has described the base fabric of the example, wherein the energy absorption amount in the warp direction (EW) and the energy absorption amount in the weft direction (EF) are 1.0 to 3.0 J/cm$^2$ and the ratio (EW/EF) of the energy absorption amount in the warp direction to the energy absorption amount in the weft direction is 0.5-2.0. Therefore, with the base fabric, even though it is made of polyester, an airbag which ensures the mechanical properties (such as tensile strength and tearing strength) and at the same time has excellent passenger restraint performance at the time of deployment may be manufactured. Also, the airbag obtained by this base fabric has small yarn slippage at a sewn portion and has excellent burst resistance.

Polyester Airbag

A polyester airbag of one example (hereinafter simply referred to as an airbag) is an airbag woven from the base fabric (the polyester base fabric for airbag) of the above example. The airbag of the example may be manufactured by a known method. In other words, the airbag is manufactured, for example, by sewing a base fabric into the shape of a bag and attaching additional device such as an inflator.

The base fabric constituting the airbag, as described in detail in the above example, even though it is made of polyester, ensures the mechanical properties (such as tensile strength and tearing strength) and at the same time has excellent passenger restraint performance at the time of deployment. Therefore, the airbag of the example ensures the mechanical properties (such as tensile strength and tearing strength) and at the same time has excellent passenger restraint performance at the time of deployment. Also, the airbag has small yarn slippage at a sewn portion and has excellent burst resistance. Such airbag is useful as an airbag of a vehicle such as an airbag for a driver's seat, an airbag for a passenger's seat, an airbag for thigh protection built in a seat, and a curtain airbag deploying along a side window.

Method of Manufacturing the Polyester Base Fabric for Airbag

A method of manufacturing the polyester base fabric of the example (which is also hereinafter simply referred to as a method for the base fabric) is a method of manufacturing the base fabric of the above example (the polyester base fabric). The method of manufacturing the base fabric is characterized in that a loom having a positive easing mechanism is used to perform weaving so that a ratio (E/H) of an easing amount (E) to a shedding amount of a first frame (H) is 3 to 10%. Thus, any of other manufacturing processes shown below is exemplary and may be suitably replaced by other known manufacturing processes. Also, for all of the configurations except for the positive easing mechanism (such as a reed, a temple device, a winding device), known configurations may be used. Thus, they are not described in detail. In the example, texture of the base fabric woven by the loom (woven fabric) is not particularly limited. Examples of the texture of the woven fabric include a plain weave, a twill weave, a satin weave, and a variation and multiaxial weave of those. Among those, the texture of the woven fabric is preferably a plain weave for being excellent in mechanical properties and being thin.

According to the example, first, warp having the total fineness described above in connection with the base fabric is warped and placed in a loom. Weft is placed in the loom in a similar manner. The loom is not particularly limited. Examples of the loom include a water jet loom, an air jet loom, and a rapier loom. Among those, the loom is preferably a water jet loom because high-speed weaving is relatively easy and the productivity can be increased easily with it.

When warping is performed, a warping sheet tension is preferably adjusted to 40 to 50 g/yarn and a beamer sheet tension is preferably adjusted to 70 to 90 g/yarn. A warp beam is suitably prepared when the warping sheet tension and the beamer sheet tension are within the above ranges. Therefore, the base fabric is excellent in weaving properties and dimensional stability can be improved. Whether the warping sheet tension and the beamer sheet tension are within the above ranges or not can be verified, for example, by measuring a tension applied to each of warp yarns with a tension measuring device in the interval between delivering and winding while the loom is operating.

When weaving is performed, the warp tension is preferably adjusted to 100 g/yarn or higher, more preferably 120 g/yarn or higher. Also, the warp tension is preferably adjusted to 250 g/yarn or lower, more preferably 230 g/yarn or lower. When the warp tension is within the above range, the obtained base fabric has a reduced number of clearances between single fibers in yarn bundles of the multifilament yarns constituting the base fabric and thus the dimensional stability may be improved. When the warp tension is lower than 100 g/yarn, restraining force of the weft is weak during weaving and a base fabric with the warp and the weft having an equal density is not likely to be obtained. On the other hand, when the warp tension is over 250 g/yarn, the base fabric tends to have large contact areas (degree of adhesion) of the warp and the weft. Therefore, warp fluffing tends to occur and the weaving properties tend to be degraded.

The method of adjusting the warp tension is not particularly limited. For example, the warp tension can be adjusted by a method in which a delivering speed of a warp of a loom is adjusted, a method in which a supplying speed of a weft is adjusted and the like. Whether the warp tension is within the above range or not can be verified, for example, by measuring a tension applied to each of warp yarns with a tension measuring device at the warp beam and the central portion of a back roller while the loom is operating.

Figure 1:
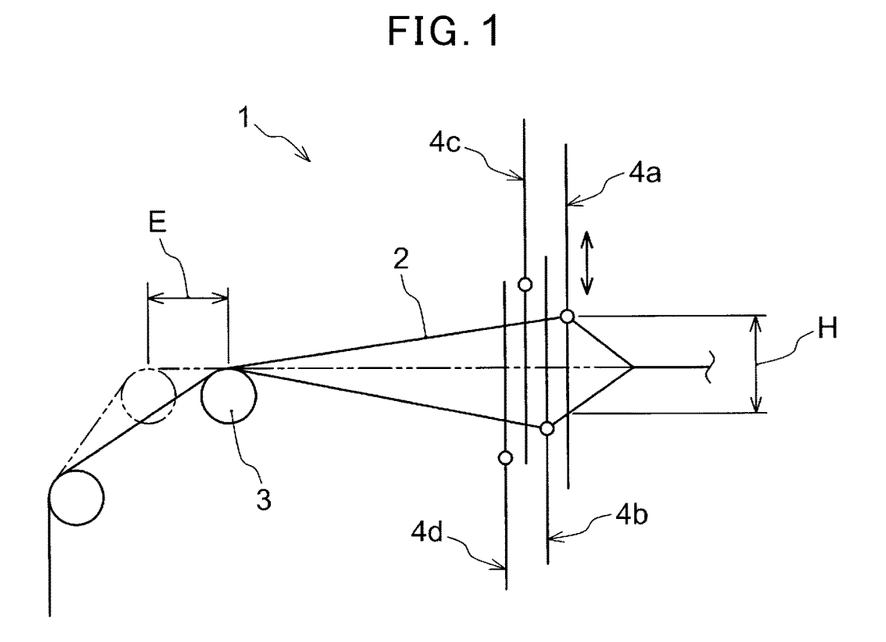
FIG. 1 is a schematic side view of a loom comprising a positive easing mechanism of one example.

In the method of manufacturing the base fabric of the example, the loom is provided with a positive easing mechanism for letting off the warp. FIG. 1 is a schematic side view of a loom 1 with a positive easing mechanism. In FIG. 1, only a part of configurations of the loom 1 is illustrated and the rest of the configurations (such as a reed and a temple device) are omitted. The loom 1 comprises a warp 2, a positive easing mechanism (back roller 3) to reduce tension variation of the warp 2, and a plurality of frame bodies (in FIG. 1, four frames of the first frame 4a, a second frame 4b, a third frame 4c, and a fourth frame 4d are illustrated) to shed the warp 2 delivered from a warp beam (not shown). The frame bodies are also called heald frames. The first frame 4a is the one of the frame bodies which is placed nearest to a cloth fell (namely, to the downstream side). When weaving is performed, the frame bodies suitably cooperate with the neighboring frame bodies to move vertically. FIG. 1 illustrates the loom 1 with the first frame 4a being elevated to its highest position. In FIG. 1, only the warps passing through the first frame 4a and the second frame 4b are illustrated and the warps passing through the third frame 4c and the fourth frame 4d are omitted.

In the example, the base fabric is woven so that a ratio (E/H) of an easing amount (E) to a shedding amount of a first frame (H) is 3% or higher, preferably 4% or higher. Also, the base fabric is woven so that the ratio (E/H) is 10% or lower, preferably 9% or lower. When the ratio (E/H) is within the above range, in the base fabric, tension of the warp 2 at the moment the weft is supplied may be reduced. Therefore, the base fabric may have larger crimp in the warp 2 and at the same time have smaller residual strain of the weft. As a result, the base fabric excellent in the balance between the respective energy absorption amounts in the warp direction and the weft direction is obtained. When the ratio (E/H) is lower than 3%, loosening of the warp at the opposite side of a yarn feeding part tends to occur while weaving is performed and the weaving properties tend to be degraded. On the other hand, when the ratio is over 10%, the tension of the warp 2 at the moment the weft is supplied is not likely to be reduced. Therefore, the base fabric is not likely to have larger crimp in the warp 2 and tends to have larger residual strain of the wet yarn. As a result, the balance between the respective energy absorption amounts in the warp direction and the weft direction tends to be worsened. Thus, in the obtained airbag, yarn slippage tends to occur at the time of deployment. In the example, the term "easing amount (E)" denotes, as shown in FIG. 1, a distance from a position of the back roller 3 at the maximum shedding of the warp 2 (the most advanced position in the direction toward the cloth fell) to a position of the back roller 3 when the warp 2 is closed (the most retreated position in the opposite direction from the cloth fell). The term "shedding amount (H)" denotes a distance from the highest position to the lowest position of the first frame 4a.

After weaving is completed, the obtained base fabric is subjected to dry treatment as needed. Drying temperature is usually 80° C. or higher. When the drying temperature is 80° C. or higher, dry-heat shrinkage of the base fabric is low and the dimensional stability is improved. As a result, the base fabric can be suitably used for airbags.

The dry treatment is usually performed with a drying machine in one manufacturing process. Examples of the drying machine include a roller dryer and a suction drum dryer. A roller dryer is a dryer adopting the hot-flue method in which the base fabric is dried by hot air. When the base fabric is dried with a roller dryer, tension applied to the base fabric due to drying is reduced to the minimum, the base fabric sufficiently shrinks, and the dimensional stability can be improved.

Then, processing such as scouring and heat setting is properly performed on the base fabric. A scouring temperature in the processing of scouring is preferably 20° C. or higher, more preferably 25° C. or higher. Also, the scouring temperature is preferably 80° C. or lower, more preferably 70° C. or lower. When the scouring temperature is 20° C. or higher, residual strain in the base fabric is eliminated, each single fiber filament in the multifilament yarns is easier to be moved, and the multifilament yarns can spread flat relative to the base fabric. Thus, the dimensional stability of the base fabric may be improved. Also, when the scouring temperature is 80° C. or lower, major shrinkage of the multifilament is inhibited. As a result, the dimensional stability of the base fabric may be improved.

A heat setting temperature in the heat setting is, as in the scouring, preferably a temperature which can eliminate the residual strain of the woven base fabric and can inhibit major shrinkage of the multifilament yarn. Specifically, the heat setting temperature is preferably 110° C. or higher, more preferably 120° C. or higher. Also, the heat setting temperature is preferably 190° C. or lower. When the heat setting temperature is within the above range, the dimensional stability of the base fabric may be improved.

Resin or elastomer coating may be applied to the base fabric after the above-mentioned manufacturing processes. The coating may provide the base fabric of the example with air impermeability. When the coating is applied, a coating amount is preferably about 5 to 35 g/m². The resin and elastomer are preferably ones having heat resistance, cold resistance, and flame retardance. For the resin or elastomer, for example, a silicone resin, a polyamide resin, a polyurethane resin, a fluororesin, and the like are suitably used.

As described above, according to the method of manufacturing the base fabric of the example, the base fabric, in which the balance between the energy absorption amount in the warp direction and the energy absorption amount in the weft direction is excellent and the mechanical properties are ensured, is obtained. The obtained base fabric is useful especially as base fabric for airbag and the obtained airbag is excellent in restraint performance to receive a passenger at the time of deployment.

One example is described in the above. Our fabrics, airbags and methods are not specifically limited to the above example. The above-mentioned example mainly describes fabrics and airbags having the below configurations.

(1) A polyester base fabric woven from polyester fibers, wherein an energy absorption amount in the warp direction (EW) when the base fabric is elongated to a stress of 118 N/cm and then relaxed to a stress of 0 N/cm is 1.0 to 3.0 J/cm², an energy absorption amount in the weft direction (EF) when the base fabric is elongated to a stress of 118 N/cm and then relaxed to a stress of 0 N/cm is 1.0 to 3.0 J/cm², and the ratio of the energy absorption amount (EW) in the warp direction to the energy absorption amount (EF) in the weft direction is from 0.5 to 2.0.

According to such configuration, an airbag which ensures mechanical properties (such as tensile strength and tearing strength) and at the same time has excellent passenger restraint performance at the time of deployment can be manufactured from the base fabric. Also, in the airbag obtained from such base fabric, yarn slippage at a sewn portion is small and burst resistance is excellent.

(2) The polyester base fabric for airbag according to the above (1), wherein a basis weight is not more than 250 g/m².

According to such configuration, the base fabric is light in weight and excellent in compactness.

(3) The polyester base fabric for airbag according to the above (1) or (2), wherein a cover factor is from 2,000 to 2,600.

According to such configuration, the base fabric suitably ensures the mechanical properties (such as tensile strength and tearing strength), has a suitable basis weight, and is not likely to be rough and hard.

(4) A polyester base fabric for airbag according to any one of the above (1) to (3), wherein an elongation of the base fabric in the warp direction when the base fabric is elongated to a stress of 118 N/cm is from 5 to 10% and an elongation of the base fabric in the weft direction when the base fabric is elongated to a stress of 118 N/cm is from 5 to 10%.

According to such configuration, the base fabric is excellent in form stability. Also, in the airbag obtained from such base fabric, a shape of its bag form can be stable at the time of high speed deployment.

(5) A polyester airbag sewn from the polyester base fabric according to any one of the above (1)-(4).

According to such configuration, the polyester base fabric for airbag is sewn to manufacture the airbags. Thus, even though it is made of polyester, the obtained airbag ensures the mechanical properties (such as tensile strength and tearing strength) and at the same time has excellent passenger restraint performance at the time of deployment. Also in the airbag, yarn slippage at a sewn portion is small and burst resistance is excellent.

(6) A method of manufacturing the polyester base fabric for airbag according to any one of the above (1)-(5), wherein a loom having a positive easing mechanism is used to perform weaving so that a ratio (E/H) of an easing amount (E) to a shedding amount of a first frame (H) is from 3 to 10%.

According to such configuration, tension of the warp at the moment the weft is supplied can be reduced. Therefore, crimp of the warp becomes larger and residual strain of the weft can be smaller. As a result, a base fabric excellent in the balance between an energy absorption amount in the warp direction and an energy absorption amount in the weft direction can be obtained.

EXAMPLES

In the following, our fabrics, airbags and methods are explained more specifically in reference to examples. This disclosure is not limited to these Examples. It is noted that in the following Examples, respective characteristic values were calculated by the following methods.

Calculation Methods of Characteristic Values

Total Fineness

The fineness based on corrected weight for a predetermined load of 0.045 cN/dtex was measured according to JIS L 1013: 2010 8. 3. 1. A method to provide the value of total fineness.

Number of Filaments

The number of filaments was measured according to a method of JIS L1013: 2010 8. 4.

Single Fiber Fineness

The total fineness was divided by the number of filaments to calculate this value.

Fabric Density

The fabric density of warps and wefts was measured according to JIS L1096: 2010 8.6.1. Specifically, a specimen was placed on a flat table, and unnatural creases and tension were removed. The number of warp and weft yarns for a 2.54 cm section was counted for five different positions, followed by calculating the average.

Coating Amount

When resin coating was performed, a part to which resin was not applied was made and an uncoated base fabric was manufactured. The basis weights of the obtained resin-coated base fabric and the uncoated base fabric were calculated respectively by the method described below, and the basis weight of the uncoated base fabric was subtracted from the basis weight of the coated base fabric to calculate the coating amount.

Fabric Thickness

The fabric thickness was calculated according to the method of JIS L1096: 2010 8. 4. Specifically, a sample was held under a pressure of 23.5 kPa for 10 seconds to make the thickness thereof even, measurements were made at five different positions in the sample using a thickness measuring device, and the average value of the measured values was calculated.

Basis Weight

According to JIS L1096: 2010 8.3.2, three 20 cm×20 cm specimens were sampled and their weight (g) was measured. The average was calculated in the form of mass per 1 $m^2$ ($g/m^2$).

Example 1

Preparation of Yarn

Untwisted synthetic filaments which consist of polyester, having a circular sectional shape, and composed 96 filaments of a single fiber with a single fiber fineness of 5.83 dtex, a total fineness of 560 dtex, a tension strength of 7.5 cN/dtex and an elongation of 21% were prepared as warps and wefts.

Warping and Producing of Beam

A warp beam was produced, using the above yarn as the warp, with the warping sheet tension of a warping machine being adjusted to 50 g/number of filament and the beamer sheet tension of a beamer being adjusted to 75 g/number of filament.

Weaving

Using the above warp beam and weft comprising the above yarn, weaving was performed with a loom comprising a positive easing mechanism (Toyota Waterjet Loom LWT710 manufactured by Toyota Industries Corporation) to obtain a woven fabric in which the weaving density of the warp is 46 yarns/2.54 cm and the weaving density of the weft is 46 yarns/2.54 cm. For the weaving, the warp tension was adjusted to 120 g/number of filament, the number of rotations of the loom was 660 rpm, the shedding amount of the first frame was 61.1 mm, and the easing amount was 3.2 mm.

Scouring and Heatsetting

Next, the obtained woven fabric was scoured at 65° C., and a heat setting process was performed at 120° C. for one minute under a dimension regulation of a tentering rate of 0% and an over feed rate of 0% by use of a pin tenter dryer.

Resin Coating

Next, a floating knife coater was used to coat the obtained woven fabric with non-solvent silicone resin having a viscosity of 50 Pa·s (50,000 cP) so that the coating amount was 29 $g/m^2$. Subsequently, vulcanizing treatment was performed at 190° C. for 1 minute to obtain base fabric. Characteristics of the obtained base fabric are shown in Table 1.

Example 2

A base fabric is obtained in a manner similar to Example 1 except that the resin coating amount was changed to 18 $g/m^2$. Characteristics of the obtained base fabric are shown in Table 1.

Example 3

A base fabric is obtained in a manner similar to Example 1 except that the easing amount was changed to 4.8 mm and the resin coating amount was changed to 28 $g/m^2$ in the weaving process. Characteristics of the obtained base fabric are shown in Table 1.

Example 4

A base fabric is obtained in a manner similar to Example 1 except that the shedding amount of the first frame was changed to 65.7 mm and the resin coating amount was changed to 27 $g/m^2$ in the weaving process. Characteristics of the obtained base fabric are shown in Table 1.

Comparative Example 1

A base fabric is obtained in a manner similar to Example 1 except that the easing amount was changed to 8.0 mm and the shedding amount of the first frame was changed to 54.9 mm in the weaving process. Characteristics of the obtained base fabric are shown in Table 1.

Comparative Example 2

A base fabric is obtained in a manner similar to Example 1 except that the easing amount was changed to 9.6 mm and the shedding amount of the first frame was changed to 54.9 mm in the weaving process. Characteristics of the obtained base fabric are shown in Table 1.

Comparative Example 3

A base fabric is obtained in a manner similar to Example 1 except that the easing amount was changed to 12.8 mm and the resin coating amount was changed to 28 $g/m^2$ in the weaving process. Characteristics of the obtained base fabric are shown in Table 1.

Evaluations of tensile strength, elongation at break, tearing strength, and energy absorption amount were conducted on each of the base fabrics obtained in Examples 1 to 4 and Comparative Examples 1 to 3 with the evaluation methods below.

Evaluation Methods

Tensile Strength

According to JIS K 6404-3: 1999 6. Test Method B (Strip Method), five specimens each were taken for the warp direction and the weft direction, and some yarns were removed from both sides of each specimen to adjust the width to 30 mm. In a constant-speed type tester, the specimen was set with a grip distance of 150 mm and pulled at a tension speed of 200 mm/min until it was broken. The maximum load during the pulling period was measured and the average was calculated for the warp direction and the weft direction.

Elongation at Break

According to JIS K 6404-3: 1999 6. Test Method B (Strip Method), elongation at break was evaluated as follows: five test pieces were collected for each of the warp direction and the weft direction and each of the test pieces was adjusted to have a width of 30 mm by removing yarns from the both sides of the width; marking lines with intervals of 100 mm were drawn at central portions of the test pieces; a constant speed strain method type tester was used to pull apart the test piece with a gripping distance of 150 mm at a tension speed of 200 mm/min until the test piece was torn off; and the distance between the marking lines was read at the moment of tearing off and the calculation was conducted according to formula (2). The elongation at break was obtained by calculating the average values in the warp direction and the weft direction respectively.

$$E = [(L-100)/100] \times 100 \qquad (2)$$

wherein E denotes the elongation at break (%) and L denotes the distance (mm) between the marking lines at the moment of tearing off.

Tearing Strength

According to JIS K 6404-4: 1999 6. Test Method B (Single Tongue Method), five specimens each with a long side of 200 mm and a short side of 75 mm were taken in the warp direction and the weft direction. A 75 mm cut was made from the center of a short side at right angles to the short side of each specimen, and it was set with a grip distance of 75 mm and pulled at a tension speed of 200 mm/min until it was torn. The load applied was measured at the time of breakage. In the tear test load chart recorded, the first peak was neglected and the three largest of the remaining maximums were taken and averaged. Averages were calculated for both the warp direction and the weft direction.

Energy Absorption Amount

Figure 2:
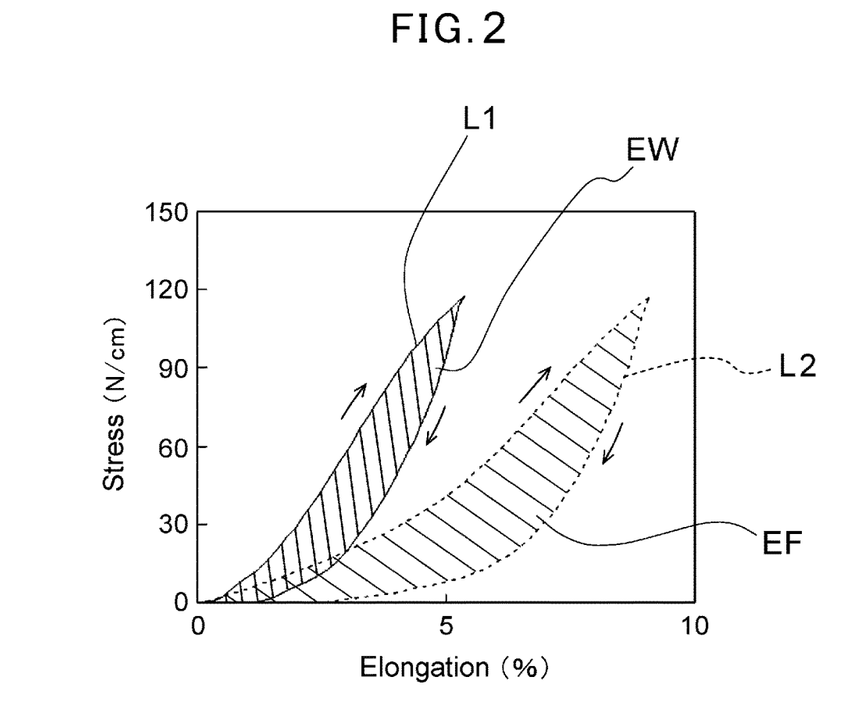
FIG. 2 is a graph showing stress-elongation curves.

According to JIS K 6404-3: 1999 6. Test Method B (Strip Method), energy absorption amount was evaluated as follows: three test pieces were collected respectively for the warp direction and the weft direction, wherein each of the test pieces was adjusted to have a width of 30 mm and a length of 300 mm by removing yarns from the both sides of the width; a constant speed strain method type tester was used to elongate the test piece with a gripping distance of 150 mm at a tension speed of 200 mm/min to a stress of 118 N/cm and, immediately after that, to relax it at a tension speed of 200 mm/min a stress of 0 N/cm. FIG. 2 is a graph showing stress-elongation curves. In FIG. 2, a stress-elongation curve for the warp direction L1 and a stress-elongation curve for the weft direction L2 are shown. According to the obtained data of the stress and the elongation and to formula (3), the areas surrounded by the curves from the beginning to the end of elongation were calculated. These areas correspond to energy amounts absorbed in the base fabric in the process from the beginning to the end of elongation. Based on the result of the integration of the calculated areas, the average values of the warp direction and the weft direction were respectively calculated, and an energy absorption amount in the warp direction (EW) and an energy absorption amount in the weft direction (EF) were calculated.

$$\text{An energy absorption amount at any given time} = \{(n+1\text{st elongation}) - (n\text{th elongation})\} \times (n+1\text{th stress}) \qquad (3)$$

The nth elongation denotes a value of elongation in the warp direction or the weft direction at any given time in the series of manufacturing processes from the application of stress in the warp direction or the weft direction to the subsequent relaxation, and the n+1th elongation (stress) denotes a value of elongation (stress) in the warp direction or the weft direction after 50 msec from the value of the nth elongation (stress). According to formula (3), an energy absorption amount at any given time was calculated in the series of manufacturing processes from the application of stress in the warp direction or the weft direction and the subsequent relaxation. Thus, by adding up energy absorption amounts obtained at each point of time from the beginning to the end, the areas (which are, namely, the energy absorption amount (EW) and the energy absorption amount (EF)) shown in FIG. 2 can be calculated.

Yarn Slippage Amount

Figure 3:
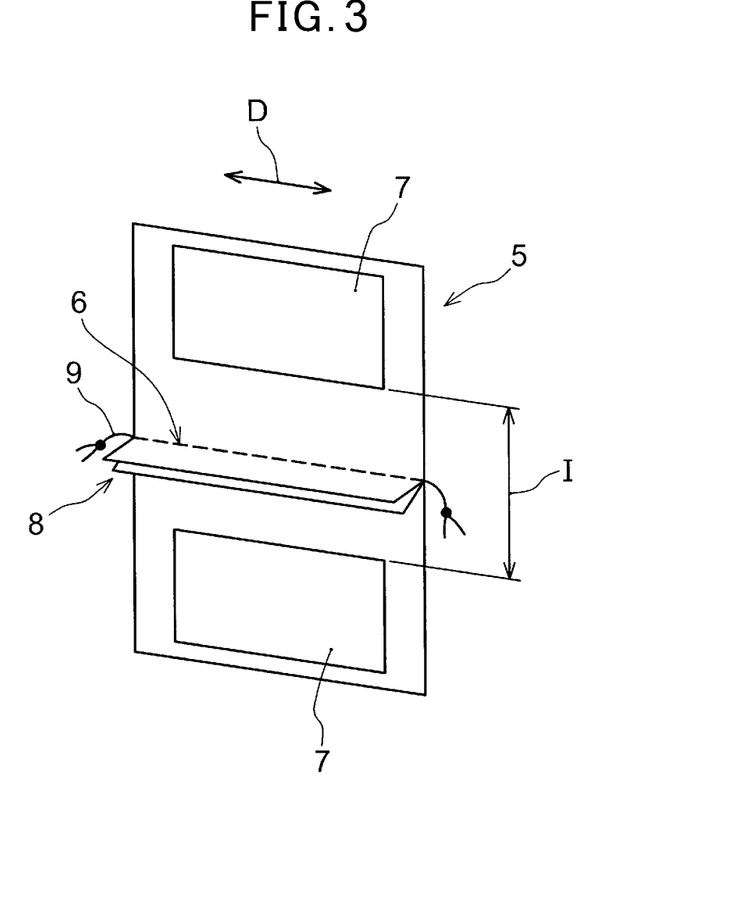
FIG. 3 is a schematic diagram illustrating a measuring method for a yarn slippage amount.

Two samples each having a width of 7 cm were collected for the warp direction and the weft direction respectively and the ones for the warp direction and the ones for weft direction were respectively placed on top of each other (so that the resin-coated sides faced each other when the samples were resin-coated base fabric). As shown in FIG. 3, the samples were sewn together at portions 10 mm from the ends. FIG. 3 is a schematic diagram for illustrating the measuring method for yarn slippage amount. In FIG. 3, a sewn sample piece 5 is illustrated showing a stitch 6 and is held by a chuck 7. Yarn ends 9 of the stitch 6 sewing the sample pieces together at the portions 10 mm from the end 8 are tied at positions away from the sample piece on the both sides of thereof. Conditions for the sewing were as follows: a double chain sewing machine MH-380 manufactured by Juki Corporation; needles for yarn count #16; a needle thread (1400 dtex) and a bobbin thread (940 dtex) of nylon 66 fibers; and a stitch number of 3.5 stiches per centimeter. A 50-mm-width chuck 7 was used to hold the sewn sample piece 5 at the both sides of the stich 6 without touching 10 mm of the both edges in a width direction D. The sample piece 5 was fitted to a tension tester (not illustrated) with a gripping distance I of 60 mm. Gaps shown between the sewing thread and the fabric at the moment a tension of 590 N/cm was applied to the sample piece 5 at a tension speed of 200 mm/min were read, finding the five largest gaps, and the average value of the five measured values.

TABLE 1

|  | Examples | | | | Comparative Examples | | |
| --- | --- | --- | --- | --- | --- | --- | --- |
|  | 1 | 2 | 3 | 4 | 1 | 2 | 3 |
| Characteristics of polyester fiber | | | | | | | |
| Total fineness (dtex) | 560 | 560 | 560 | 560 | 560 | 560 | 560 |
| Number of filaments | 96 | 96 | 96 | 96 | 96 | 96 | 96 |
| Single fiber fineness (dtex) | 5.83 | 5.83 | 5.83 | 5.83 | 5.83 | 5.83 | 5.83 |
| Weaving conditions of base fabric | | | | | | | |
| Easing amount (E) (mm) | 3.2 | 3.2 | 4.8 | 3.2 | 8.0 | 9.6 | 12.8 |
| Shedding amount of first frame (H) (mm) | 61.1 | 61.1 | 61.1 | 65.7 | 54.9 | 54.9 | 61.1 |
| E/H (%) | 5.2 | 5.2 | 7.9 | 4.9 | 13.1 | 17.5 | 20.9 |
| Coating condition of resin | | | | | | | |
| Coating amount (g/m$^2$) | 29 | 18 | 28 | 27 | 29 | 29 | 28 |
| Characteristics of base fabric and airbag | | | | | | | |
| Weaving density (yarns/2.54 cm) of | | | | | | | |
| Warp | 46 | 46 | 46 | 46 | 47 | 46 | 46 |
| Weft | 47 | 46 | 47 | 47 | 46 | 45 | 46 |
| Thickness (mm) | 0.30 | 0.28 | 0.29 | 0.28 | 0.32 | 0.31 | 0.30 |
| Cover factor | 2201 | 2177 | 2201 | 2201 | 2201 | 2153 | 2177 |
| Basis weight (g/m$^2$) | 248 | 235 | 244 | 246 | 245 | 245 | 241 |
| Tensile strength (N/cm) in | | | | | | | |
| Warp direction | 712 | 699 | 683 | 693 | 695 | 694 | 747 |
| Weft direction | 687 | 690 | 681 | 688 | 679 | 655 | 694 |
| Elongation at break (%) in | | | | | | | |
| Warp direction | 27.1 | 27.7 | 25.9 | 29.1 | 25.1 | 26.2 | 23.3 |
| Weft direction | 30.3 | 30.4 | 30.4 | 28.8 | 30.1 | 29.9 | 30.6 |
| Tearing strength (N) in | | | | | | | |
| Warp direction | 235 | 231 | 225 | 235 | 239 | 251 | 227 |
| Weft direction | 233 | 224 | 220 | 222 | 241 | 250 | 224 |
| Energy absorption amount (EW) (J/cm$^2$) | 1.77 | 1.67 | 1.08 | 2.51 | 0.79 | 0.72 | 0.68 |
| Energy absorption amount (EW) (J/cm$^2$) | 1.75 | 1.77 | 2.07 | 1.61 | 2.03 | 1.95 | 2.15 |
| Ratio (EW/EF) | 1.01 | 0.94 | 0.52 | 1.56 | 0.39 | 0.37 | 0.32 |
| Elongation when it is elongated up to stress of 118 N/cm (%) in | | | | | | | |
| Warp direction | 7.6 | 7.4 | 5.4 | 9.8 | 4.9 | 4.8 | 4.7 |
| Weft direction | 8.1 | 8.5 | 9.1 | 8.0 | 8.8 | 7.6 | 10.1 |
| Yarn slippage amount at woven portion (mm) in | | | | | | | |
| Warp direction | 0.7 | 0.8 | 1.0 | 0.4 | 1.5 | 1.6 | 1.8 |
| Weft direction | 0.7 | 0.7 | 0.6 | 0.9 | 0.6 | 0.6 | 0.5 |
| Difference between yarn slippage amounts at woven portions (mm) | 0 | 0.1 | 0.4 | 0.5 | 0.9 | 1.0 | 1.3 |

As shown in Table 1, any of the base fabrics manufactured in Examples 1 to 4 had the mechanical properties (tensile strength, elongation at break, and tearing strength) required for airbags. Also, these base fabrics had an energy absorption amount required for protecting an occupant at the time of airbag deployment. Further, those base fabrics had small and even yarn slippages at woven portions both in the warp direction and the weft direction. Therefore, an airbag obtained from these base fabrics is excellent in burst resistance.

On the other hand, any of the base fabrics manufactured in Comparative Examples 1-3 had a small energy absorption amount (EW) in the warp direction and did not have the energy absorption amount required for protecting an occupant at the time of airbag deployment. Also, these base fabrics had large yarn slippage at woven portions in the warp direction. Therefore, an airbag obtained from these base fabrics is inferior in burst resistance.

The invention claimed is:

1. A polyester base fabric for airbags woven from polyester fiber, wherein:

an energy absorption amount in a warp direction (EW) when the polyester base fabric is elongated up to a stress of 118 N/cm and subsequently relaxed to a stress of 0 N/cm is 1.0 to 3.0 J/cm$^2$;

an energy absorption amount in a weft direction (EF) when the polyester base fabric is elongated up to a stress of 118 N/cm and subsequently relaxed to a stress of 0 N/cm is 1.0 to 3.0 J/cm$^2$;

a ratio (EW/EF) of the energy absorption amount in the warp direction (EW) to the energy absorption amount in the weft direction (EF) is 0.5 to 2.0.

2. The polyester base fabric for airbag of claim 1, wherein a basis weight is not more than 250 g/m$^2$.

3. The polyester base fabric for airbag of claim 1, having a cover factor of 2,000 to 2,600.

4. The polyester base fabric for airbag of claim 1, wherein:

an elongation in the warp direction when the polyester base fabric is elongated up to a stress of 118 N/cm is 5 to 10%; and an elongation in the weft direction when the polyester base fabric is elongated up to a stress of 118 N/cm is 5 to 10%.

5. A polyester airbag woven from the polyester base fabric of claim 1.

6. A method of manufacturing the polyester base fabric of claim 1, comprising:

using a loom having a positive easing mechanism to perform weaving so that a ratio (E/H) of an easing amount (E) to a shedding amount of a first frame (H) is 3 to 10%.

7. The polyester base fabric for airbag of claim 2, having a cover factor of 2,000 to 2,600.

8. The polyester base fabric for airbag of claim 2, wherein:

an elongation in the warp direction when the polyester base fabric is elongated up to a stress of 118 N/cm is 5 to 10%; and an elongation in the weft direction when the polyester base fabric is elongated up to a stress of 118 N/cm is 5 to 10%.

9. The polyester airbag of claim 5, wherein a basis weight of the polyester base fabric is not more than 250 g/m$^2$.

10. The method of manufacturing the polyester base fabric for airbag of claim 6, wherein a basis weight of the polyester base fabric is not more than 250 g/m$^2$.

* * * * *